United States Patent [19]

Wada et al.

[11] 4,208,564
[45] Jun. 17, 1980

[54] NOZZLE STRUCTURE OF ELECTROSLAG WELDING MACHINES

[75] Inventors: Takeshi Wada; Hisanao Kita; Tetsuo Okuni, all of Hitachi, Japan; Yoshio Namatame, deceased, late of Hitachi, Japan, by Akemi Namatame, administratrix

[73] Assignee: Hitachi, Ltd., Toyko, Japan

[21] Appl. No.: 904,988

[22] Filed: May 11, 1978

Related U.S. Application Data

[62] Division of Ser. No. 708,210, Jul. 23, 1976, abandoned.

[30] Foreign Application Priority Data

Jul. 25, 1975 [JP] Japan .................................. 50-90086

[51] Int. Cl.² .............................................. B23K 25/00
[52] U.S. Cl. ................................ 219/73.1; 219/137.2; 219/137.44
[58] Field of Search ................. 219/73 R, 73.1, 73.11, 219/119, 120, 137.2, 137.44

[56] References Cited

U.S. PATENT DOCUMENTS

| | | | |
|---|---|---|---|
| 3,211,887 | 10/1965 | Cotterman | 219/73.1 |
| 3,352,993 | 11/1967 | Suzuki | 219/73.1 |
| 3,504,105 | 3/1970 | Bogner | 174/126 S |

FOREIGN PATENT DOCUMENTS

| | | | |
|---|---|---|---|
| 1155015 | 6/1969 | United Kingdom | 219/73.1 |
| 1379438 | 2/1975 | United Kingdom | 219/73.1 |

Primary Examiner—E. A. Goldberg
Attorney, Agent, or Firm—Thomas E. Beall, Jr.

[57] ABSTRACT

A nozzle structure of electroslag welding machines for use in welding planks having heavier thicknesses compared to previously electroslag welded planks, and having as much as 800 mm thicknesses, in which the nozzle structure is formed of a plurality of bent pipes rigidly connected with each other to form a fan-shaped nozzle structure. A plurality of wires are continuously fed through each of the bent pipes into a weld gap formed by faces of planks to be welded.

15 Claims, 8 Drawing Figures

NOZZLE STRUCTURE OF ELECTROSLAG WELDING MACHINES

This application is a division of application Ser. No. 708,210, filed July 23, 1976 and now abandoned.

BACKGROUND OF THE INVENTION

This invention relates to electroslag welding machines and more particularly to an improvement in nozzle structures of the electroslag welding machines for use in welding large sized planks having heavier thicknesses.

Recently, with the increase of large sized machines such as steam boilers, heavy mechanical presses and rolling mills, large sized components are needed for the fabrication of the machines.

It has been known that an electroslag welding method can be used in making large sized components having as large as 150 to 300 mm thickness by joining two planks with the electroslag welding method, which is described in Japanese Laid Open Print of Patent Application No. 48-47467 (Application Ser. No. 46-83591). In this prior method, a plurality of consumable nozzle plates are vertically placed within a weld gap formed by faces of planks to be welded. However, these nozzle plates are consumed as welding progresses and it is needed to hang a plurality of long nozzle plates within the weld gap while welding.

Another method usually used in welding planks is an electroslag welding method (not consumable nozzle type) in which a nozzle or a plurality of nozzles are inserted within a weld gap formed by faces of planks to be welded from one side of the weld gap, and wires are continuously fed to the weld gap through the nozzles keeping pace with welding progress. The nozzles move upward within the weld gap while oscillating along the weld. An example of the prior method is described in "Electroslag Welding", by Paton page 191 to 212. However, in the conventional electroslag welding machine, each nozzle is separated and dependently supported to the welding machine. The stiffness of the nozzle depends on the length of the nozzle pipe projecting out from the welding machine into the weld gap. Therefore, when a conventional nozzle is elongated for use in welding large planks having heavier thickness, the stiffness of the nozzle decreases and a short circuit may appear between the nozzle and the planks to be welded by the sag or the rocking motion of the nozzle structure.

SUMMARY OF THE INVENTION

The present invention has been conceived to eliminate the above defects and one object of the present invention is to provide an improved electroslag welding machine which can be used in welding planks having heavier thicknesses by feeding a plurality of wires to a weld gap through a nozzle strucutre.

Another object of the present invention is to provide an improved nozzle structure with higher stiffness for use in welding planks having heavier thicknesses.

A further object of the present invention is to provide a simplified nozzle structure for use in welding planks having heavier thicknesses.

Still another object of the present invention is to provide an improved nozzle structure which can be used in welding planks having heavier thicknesses with higher accuracy.

Briefly stated, the invention comprises a nozzle structure formed of a plurality of nozzle equipments, which serves both for an electrode and a support of wires fed in a weld gap formed by faces of components to be welded. The nozzle equipments are rigidly connected with each other to form a monoblock type nozzle structure so that a plurality of wires are continuously supplied into the weld gap formed by faces of planks having heavier thicknesses.

PREFERRED EMBODIMENTS OF THE INVENTION

Figure 1:
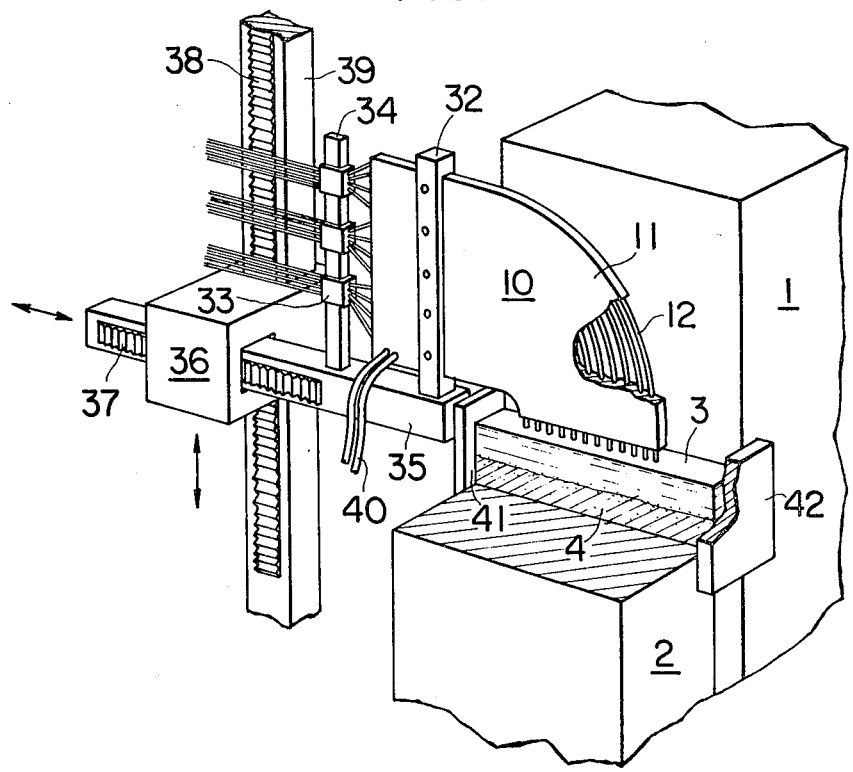
FIG. 1 is a perspective view, partly in section of the electroslag welding machine using a nozzle structure of the present invention.

Referring to FIG. 1 of the drawing, there is illustrated one embodiment of the electroslag welding machine using a monoblock type nozzle structure of the present invention.

A pair of planks 1 and 2 being welded are positioned facing each other with a certain gap, ie weld gap, in which the plank 2 is partially broken away to show the nozzle structure 10 of the present invention. The nozzle 10 is formed of a fan-shaped plate 11 having a plurality of through holes, through which a plurality of wires 12 pass. The wires 12 inserted from the upper opening of the through holes of the fan-shaped plate 11 come out of lower openings of the holes of the fan-shaped plate 11. The nozzle 10 is inserted in the weld gap between plank 1 and 2 from one side of the planks in a manner that one side of the fan-shaped plate 11 is horizontally placed in the weld machine gap and another side of the fan-shaped plate 11 is placed out of the weld gap.

The operation of the electroslag welding machine by using the nozzle 10 of the present invention will now be described with reference to FIG. 1.

The plate 11, through which a plurality of the wires 12 are fed in a molten slag pool 3 in the weld gap, is rigidly mounted to a support 32. Current supplied through a cable 40 to the plate 11 flows through the wires 12, the molten slag pool 3 and weld pool 4 into the planks 1 and 2. The wires 12, which melt by Joule heat caused by the current, are continuously supplied by a wire supplying mechanism (not shown) keeping pace with the melting speed of the wires 12 progresses.

The wires 12 are bundled in a head 33 mounted on a support 34. Copper shoes 41 and 42 which are internally water cooled are mounted on both sides of the planks 1 and 2 so as to prevent a flow of the molten slag 3 from the weld gap. The supports 32 and 33 are vertically mounted on a beam 35 which is allowed horizontal reciprocating motions by a manipulator 36 so that the nozzle 10 moves horizontally along the weld gap. A rack gear 37 mounted on the beam 35 is fit to a horizontal traveling mechanism (not shown) in the manipulator 36. The manipulator 36 also has a vertical traveling mechanism (not shown) to allow vertical travels of the nozzle 10, which is fit to a rack gear 38 mounted on a vertical beam 39, so that a constant gap between the lower side of the plate 11 and the surface of the molten slag pool 3 is continously kept. The copper shoes 41 and 42 are linked with the manipulator 36 so that the copper shoes move upwardly with the elevation of the nozzle 10.

Figure 2:
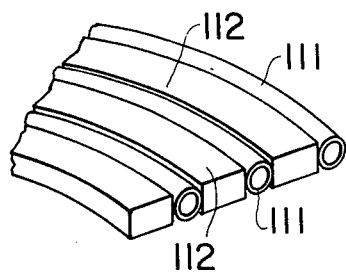
FIG. 2 is a sectional view of a nozzle structure according to one embodiment of the present invention.

Referring to FIG. 2 of the drawing, there is illustrated one embodiment of the nozzle structure 10 of FIG. 1. In this embodiment, the nozzle structure is composed of a plurality of bent pipes 111 to pass the wires therethrough and a plurality of strip plates 112. The bent pipes 111 and the strip plates 112 are connected alternately and parallel to each other in a plane for example by welding the bent pipes and the strip plates to form the fan-shaped nozzle structure as illustrated in FIG. 1.

Figure 3:
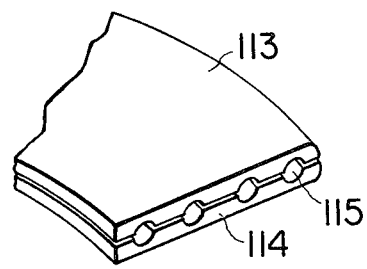
FIG. 3 is a sectional view of a nozzle structure according to another embodiment of the present invention.

Another embodiment is illustrated in FIG. 3, in which the nozzle structure is formed of a pair of fan-shaped plates 113 and 114. The inner sides of the plates have grooves to form the through holes 115 when the plates are piled to each other, for example by welding, bolts or any other fastening means.

Figure 4:
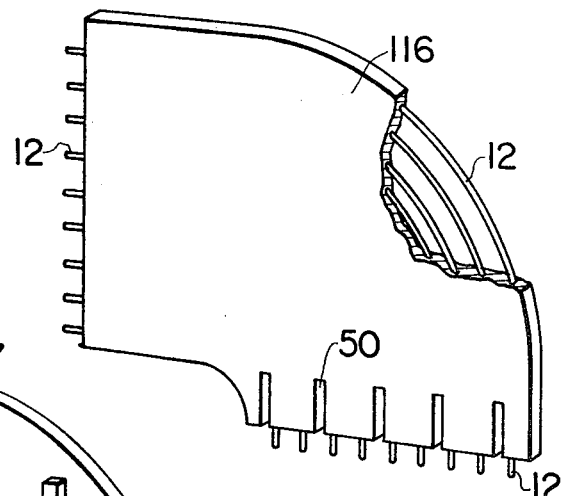
FIG. 4 is a perspective view, partly in section of the nozzle structure of the present invention.

Referring to FIG. 4 of the drawing, the nozzle structure 116 is provided with grooves 50 at the lower portion thereof so that deformations as a result of heat expansion of the nozzle structure 116 may not occur at the lower portion of the nozzle structure 116. The grooves 50 absorb the heat expansion of the nozzle structure 116 and prevent the deflection thereof.

The grooves 50 may be elongated or the number of the grooves 50 may be increased to such an extent that the sag or the rocking motion of the nozzle structure 116 caused by the reduction of the stiffness thereof does not appear.

Figure 5:
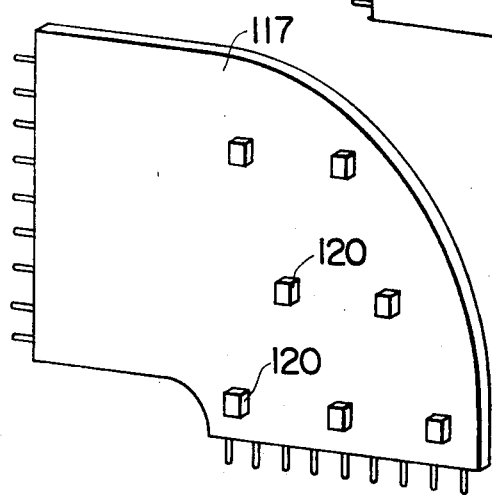
FIG. 5 is a perspective view of the nozzle structure provided with insulating projections of the present invention.

Referring now to FIG. 5 of the drawing, insulating projections 120 are provided on opposite surfaces of the nozzle plate 117 so as to prevent a short circuit in the weld gap between the nozzle plate 117 and the surfaces of the planks to be welded. The insulating projections 120 are made of electrically insulating materials with heat resistance and stiffness such as for example asbestos. The number of the insulating projections 120 and the hight thereof can be determined in such a manner that even if the nozzle plate 117 swings in the weld gap, the nozzle plate 117 does not touch the surfaces of the planks to be welded.

The insulating projections 120 are mounted on the nozzle plate 117 by the following manners.

Figure 6:
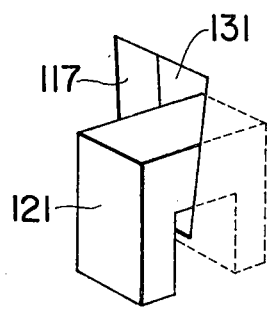
FIGS. 6, 7, 8 are enlarged views of insulating projections of the present invention.

FIG. 6 shows one embodiment of the projection, in which the projection 121 made of asbesto plate is formed like a saddle and is inserted in a V-shaped hole 131 bored on the plate 117. The projection 121 is inserted in the hole 131 and frictionally supported therein.

Figure 7:
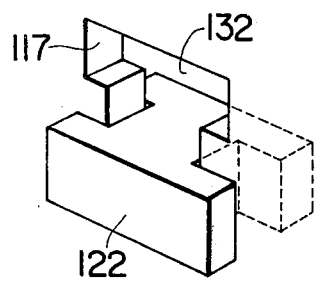

FIG. 7 shows another embodiment of the projection, in which the projection 122 is formed into H-shape and inserted in a T-shaped hole 132 formed in the nozzle plate 117.

Figure 8:
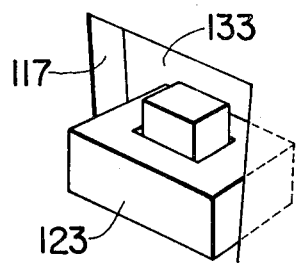

FIG. 8 shows still another embodiment of the projection in which the projection 123 is formed into O-shape and is inserted into an inverted U-shaped hole 133 formed by a W-shaped wall formed in the nozzle plate 117.

According to the present invention, a higher stiffness of the nozzle structure is obtained so that large sized components having heavier thickness as large as 800 mm thickness can be welded by using an electroslag welding machine with a long armed nozzle structure.

According to another feature of the present invention, a higher stiffness of the nozzle structure is obtained so that a simplified electroslag welding machine can be obtained for use in welding large sized components.

According to still another feature of the present invention, failures of welding caused by the sag or rocking motion of the nozzle structure and short circuit between the nozzle structure and planks to be welded are eliminated so that an accurate electroslag welding can be obtained.

While several embodiments, with variations, have been set forth for purposes of illustration of the broader principles as well as their specific structure, further embodiments, modifications and variations are contemplated, all according to the spirit and scope of the following claims.

What is claimed is:

1. A device for using a consumable wire for electroslag welding in a weld gap between the adjacent spaced faces of components to be welded, which weld gap has a molten pool at one end during welding, an opposite end and opposed sides, comprising:

a plurality of nozzle means, each serving both as an electrode and a support through which consumable wire is continuously fed into the molten pool in the weld gap, and each extending from an inlet end and outside of the weld gap through one of the sides of the weld gap to an outlet end immediately adjacent the molten pool, with the outlet ends being spaced along the extent of the molten pool;

means for feeding the consumable wire from the outside of the weld gap into the inlet ends of the nozzle means respectively, through the nozzle means to be guided thereby, and out of the outlet ends of the nozzle means;

means for moving said nozzle means relative to the components so that the outlet ends of the nozzle means within the weld gap will keep pace with the welding process to prevent said nozzle means from melting during welding so that said nozzle means are non-consumable;

means rigidly connecting said plurality of nozzle means to each other to form a rigid nozzle structure so that the plurality of wires are continuously fed through the weld gap in a stable manner to the molten pool;

each of said nozzle means comprising a curved pipe means through which the wire is fed in the weld gap from the one side of the weld gap and said connecting means rigidly connecting all of said curved pipe means parallel to each other in a plane to form a fan-shaped nozzle structure;

said inlet ends being parallel to each other in one plane and said outlet ends being parallel to each other in another plane that is generally perpendicular to said one plane of said inlet ends;

said connecting means comprising curved strip plates placed between said curved pipe means and rigidly connected to each of said curved pipe means; and said connecting means having expansion absorbing means provided along said curved pipe means to absorb thermal expansion without distortion.

2. The structure as defined in claim 1, wherein said expansion absorbing means comprise a plurality of grooves in at least some of said strip plates along said curved pipe means.

3. The structure as defined in claim 1, including electrical insulating means mounted on opposite sides of said nozzle structure to prevent a short circuit between the nozzle structure and the component to be welded within the weld gap.

4. The structure as defined in claim 3, wherein said electrical insulating means comprise a plurality of separate members constructed of electrically insulating material, and a corresponding plurality of through apertures in said nozzle structure, with one of said insulating members being form locked in each of said apertures to project outwardly from opposite faces of said nozzle structure towards faces of the components to be welded, and said apertures being enlarged above said members to permit upward unlocking movement of said members and lateral withdrawal of said members from said apertures.

5. The structure as defined in claim 4, wherein each of said members is substantially H-shaped with one leg of the H-shape extending outwardly from one face of the nozzle structure, the other leg of the H-shape extending outwardly from the opposite face of the nozzle structure, and the web portion of the H-shape extending within said aperture; and said aperture being generally T-shaped.

6. The structure as defined in claim 4, wherein each of said members is an inverted U-shape with one leg portion of the U-shape extending outwardly from one side of the nozzle structure, the other leg of the U-shape extending outwardly from the opposite side of the nozzle structure, and the web of the U-shape extending within the respective aperture; and each of said apertures being generally wedge shaped with its width decreasing downwardly.

7. The structure as defined in claim 4, wherein each of said members in substantially O-shaped and lying in a plane generally perpendicular to the nozzle structure, and each of said apertures being generally an inverted U-shape.

8. The structure as defined in claim 3, wherein said insulating means comprises a plurality of projections of electrically insulating material provided on opposite sides of said nozzle structure.

9. A device for using a consumable wire for electroslag welding in a weld gap between the adjacent spaced faces of components to be welded, which weld gap has a molten pool at one end during welding, an opposite end and opposed sides, comprising:

a plurality of nozzle means, each serving both as an electrode and a support through which consumable wire is continuously fed into the molten pool in the weld gap, and each extending from an inlet end and outside of the weld gap through one of the sides of the weld gap to an outlet end immediately adjacent the molten pool, with the outlet ends being spaced along the extent of the molten pool;

means for feeding the consumable wire from the outside of the weld gap into the inlet ends of the nozzle means respectively, through the nozzle means to be guided thereby, and out of the outlet ends of the nozzle means;

means for moving said nozzle means relative to the components so that the outlet ends of the nozzle means within the weld gap will keep pace with the welding process to prevent said nozzle means from melting during welding so that said nozzle means are non-consumable;

means rigidly connecting said plurality of nozzle means to each other to form a rigid nozzle structure so that the plurality of wires are continuously fed through the weld gap in a stable manner to the molten pool;

said nozzle means being formed by a pair of generally coextensive fan-shaped plates secured face to face to each other, and each of said fan-shaped plates having a plurality of grooves on its surface that faces the other fan-shaped plate, which grooves are in registry with the grooves of the other fan-shaped plate to form a plurality of curved pipe means between said fan-shaped plates with each pipe means providing a passage through which the wire is fed in the weld gap from the side of the weld gap;

said inlet ends being parallel to each other in one plane and said outlet ends being parallel to each other in another plane that is generally perpendicular to said one plane of said inlet ends; and said connecting means having expansion absorbing means provided along said nozzle means to absorb thermal expansion without distortion of said nozzle means.

10. The structure as defined in claim 9, including electrical insulating means mounted on opposite sides of said nozzle structure to prevent a short circuit between the nozzle structure and the component to be welded within the weld gap.

11. The structure as defined in claim 10, wherein said electrical insulating means comprise a plurality of separate members constructed of electrically insulating material, and a corresponding plurality of through apertures in said nozzle structure, with one of said insulating members being form locked in each of said apertures to project outwardly from opposite faces of said nozzle structure towards faces of the components to be welded, and said apertures being enlarged above said members to permit upward unlocking movement of said members and lateral withdrawal of said members from said apertures.

12. The structure as defined in claim 11, wherein each of said members is substantially H-shaped with one leg of the H-shape extending outwardly from one face of the nozzle structure, the other leg of the H-shape extending outwardly from the opposite face of the nozzle structure, and the web portion of the H-shape extending within said aperture; and said aperture being generally T-shaped.

13. The structure as defined in claim 11, wherein each of said members is an inverted U-shape with one leg portion of the U-shape extending outwardly from one side of the nozzle structure, the other leg of the U-shape extending outwardly from the opposite side of the nozzle structure, and the web of the U-shape extending within the respective aperture; and each of said apertures being generally wedge shaped with its width decreasing downwardly.

14. The structure as defined in claim 11, wherein each of said members is substantially O-shaped and lying in a plane generally perpendicular to the nozzle structure, and each of said apertures being generally an inverted U-shape.

15. The structure as defined in claim 10, wherein said insulating means comprises a plurality of projections of electrically insulating material provided on opposite sides of said nozzle structure.

* * * * *